(12) United States Patent
Dengler

(10) Patent No.: US 9,302,378 B2
(45) Date of Patent: Apr. 5, 2016

(54) ASSEMBLY TOOL FOR MECHANICAL SEALS

(75) Inventor: Andreas Dengler, Friedberg (DE)

(73) Assignee: Federal-Mogul Burscheid GmbH, Burscheid (DE)

( * ) Notice: Subject to any disclaimer, the term of this patent is extended or adjusted under 35 U.S.C. 154(b) by 229 days.

(21) Appl. No.: 14/000,304

(22) PCT Filed: Jan. 20, 2012

(86) PCT No.: PCT/DE2012/000049
§ 371 (c)(1),
(2), (4) Date: Aug. 19, 2013

(87) PCT Pub. No.: WO2012/110015
PCT Pub. Date: Aug. 23, 2012

(65) Prior Publication Data
US 2013/0318760 A1      Dec. 5, 2013

(30) Foreign Application Priority Data
Feb. 17, 2011   (DE) .......................... 10 2011 011 476

(51) Int. Cl.
*B25B 27/00*      (2006.01)
*F16J 15/34*      (2006.01)

(52) U.S. Cl.
CPC ........... *B25B 27/0028* (2013.01); *F16J 15/344* (2013.01); *Y10T 29/53909* (2015.01); *Y10T 29/53991* (2015.01)

(58) Field of Classification Search
USPC .......................................................... 29/270
See application file for complete search history.

(56) References Cited

U.S. PATENT DOCUMENTS

| | | | | |
|---|---|---|---|---|
| 2,754,162 A * | 7/1956 | Tapp | ............................... | 384/483 |
| 3,147,048 A * | 9/1964 | Johnson et al. | ................ | 384/584 |
| 3,322,431 A * | 5/1967 | Solari | ............................ | 277/380 |
| 3,420,584 A * | 1/1969 | Cannon | ......................... | 384/139 |
| 4,085,981 A * | 4/1978 | Takenaka | ....................... | 384/418 |
| 4,152,031 A * | 5/1979 | Maguire | ........................ | 305/119 |
| 4,168,072 A * | 9/1979 | Fukui | ............................ | 277/403 |
| 4,216,973 A * | 8/1980 | Kessinger, Jr. | ................ | 277/349 |
| 4,248,439 A * | 2/1981 | Haslett | .......................... | 277/380 |

(Continued)

FOREIGN PATENT DOCUMENTS

| | | | | |
|---|---|---|---|---|
| DE | 27 29 928 | | 1/1978 | |
| DE | 3141512 A1 * | | 5/1983 | ............... F16J 15/34 |

(Continued)

*Primary Examiner* — Lee D Wilson
*Assistant Examiner* — Alvin Grant
(74) *Attorney, Agent, or Firm* — Jordan and Hamburg LLP

(57) ABSTRACT

An assembly tool for inserting a slide ring or counter ring of a slide ring seal, in particular a running gear seal, cooperating with an elastic sealing body into an associated housing part, the assembly tool including a number of clamping elements formed as arcuate segments and an assembly O-ring, wherein the clamping elements engage around the slide ring or counter ring, and around the sealing body and the assembly O-ring in a manner that corresponds to the circumferential length thereof, and the clamping elements are advanceable in the direction of the housing part in order to mount the sealing body within this housing part.

10 Claims, 5 Drawing Sheets

(56) References Cited

U.S. PATENT DOCUMENTS

| | | | |
|---|---|---|---|
| 4,466,622 A * | 8/1984 | Deane et al. | 175/371 |
| 5,527,046 A * | 6/1996 | Bedford | 277/381 |
| 6,540,208 B1 * | 4/2003 | Pecot et al. | 254/134.4 |
| 7,370,865 B2 | 5/2008 | Vik et al. | |
| 2010/0230172 A1 * | 9/2010 | Peterson | 175/371 |
| 2011/0243648 A1 * | 10/2011 | Johannsen et al. | 403/119 |
| 2012/0161399 A1 * | 6/2012 | Kupper et al. | 277/390 |
| 2012/0161510 A1 * | 6/2012 | Diekevers et al. | 305/104 |
| 2012/0163904 A1 * | 6/2012 | Liang et al. | 403/161 |
| 2012/0223485 A1 * | 9/2012 | Heo | 277/500 |

FOREIGN PATENT DOCUMENTS

| | | | | |
|---|---|---|---|---|
| DE | 35 34 452 | | 4/1987 | |
| DE | 37 25 887 | | 2/1989 | |
| DE | 3725887 A1 * | 2/1989 | | F16J 15/38 |
| DE | 3836717 A1 * | 5/1990 | | F16J 15/34 |
| DE | 197 53 918 | | 7/1999 | |
| DE | 199 55 859 | | 6/2001 | |
| JP | 50-8538 | | 4/1975 | |
| WO | WO 2005047720 A1 * | 5/2005 | | F16C 33/78 |
| WO | WO 2006002845 A1 * | 1/2006 | | B62D 55/15 |
| WO | WO 2010015224 A1 * | 2/2010 | | F16J 15/34 |

* cited by examiner

ASSEMBLY TOOL FOR MECHANICAL SEALS

BACKGROUND OF THE INVENTION

The invention relates to an assembly tool for inserting a slide ring or counter ring of a slide ring seal, in particular of a running gear seal, cooperating with an elastic sealing body, into an associated housing part.

In the assembly of running gear seals, it is essential that the press-in force be exerted directly to the elastic sealing body and not the slide ring. In particular in the case of large seals, this has heretofore been achieved using very heavy and expensive steel tools, such that both the assembly and the tool transport are extremely costly.

U.S. Pat. No. 7,370,885 B2 relates to an assembly tool for slide ring and counter rings of a running gear seal that work together with elastic sealing bodies. This assembly tool comprises an approximately disk-shaped component, which is provided with a projection extending circumferentially in an axial direction, that projection engaging in a housing part outside of the slide ring or counter ring on the elastic sealing body for the purpose of pressing in the sealing body. If the sealing body is positioned within the housing part, a stop provided on the component comes to rest on an opposing surface of the housing part. As already indicated, this approach is considered to be impractical.

SUMMARY OF THE INVENTION

The primary object of the present invention is to provide an assembly tool for inserting a slide ring or counter ring, cooperating with an elastic sealing body in an associated housing part, which is easily built and which allows simplified assembly of the respective slide ring or counter ring within an associated housing part. The assembly tool is not only intended for use during the initial assembly, but can also be used for repair purposes at various locations.

This object is achieved by an assembly tool for inserting a slide ring or counter ring of a slide ring seal, in particular a running gear seal, cooperating with an elastic sealing body into an associated housing part, the assembly tool comprising a number of clamping elements formed as arcuate segments and an assembly O-ring, wherein the clamping elements engage around the slide ring or counter ring, and around the sealing body and the assembly O-ring in a manner that corresponds to the circumferential length thereof, and the clamping elements are advanceable in the direction of the housing part in order to mount the sealing body within this housing part.

In contrast to the prior art, an assembly tool is now provided comprising only a few components, which are notably lightweight, which can be used at substantially any location.

The clamping elements are advantageously made of plastic and therefore have a lightweight construction. The clamping elements formed as circular segments are mechanically secured to the slide ring or counter ring, for example by means of clamp screws, wherein the force from the slide ring or counter ring can then be transferred directly to the elastic sealing body via the assembly O-ring.

Other solutions lend themselves to the application of force. On one hand, a tool such as a pressure roll or a punch can be employed; on the other hand the force component can also be manually applied by one or more operators.

It is especially advantageous that, when using the clamping elements according to the invention in operative connection with the associated assembly O-ring, even relatively large slide ring seals, and in particular running gear seals, can be cost-effectively positioned within associated housing parts.

The assembly tool according to the invention is light and can be easily operated without the use of a crane. A suitcase suffices for transport, so that an assembler can bring that assembly tool on an airplane to any location.

The precise assembly of the elastic sealing body is then completed, when a projection provided on the respective clamping element comes to rest on an opposing surface of the housing part.

If the elastic sealing body is precisely positioned within the housing part, the clamping elements are released and the assembly O-ring, which according to a further aspect of the invention, is provided with at least a band-shaped buttstrap, is drawn over the slide ring or counter ring.

BRIEF DESCRIPTION OF THE DRAWINGS

The subject matter of the invention is depicted in the drawings based on an embodiment, and is described as follows. Shown are:

FIG. 2 A partial view of the assembly tool according to FIG. 1 in position before the sealing body is pressed in;

FIG. 3 A cross section of the assembly tool according to FIG. 1 in position after the sealing body has been pressed in;

DETAILED DESCRIPTION OF THE INVENTION

Figure 1:
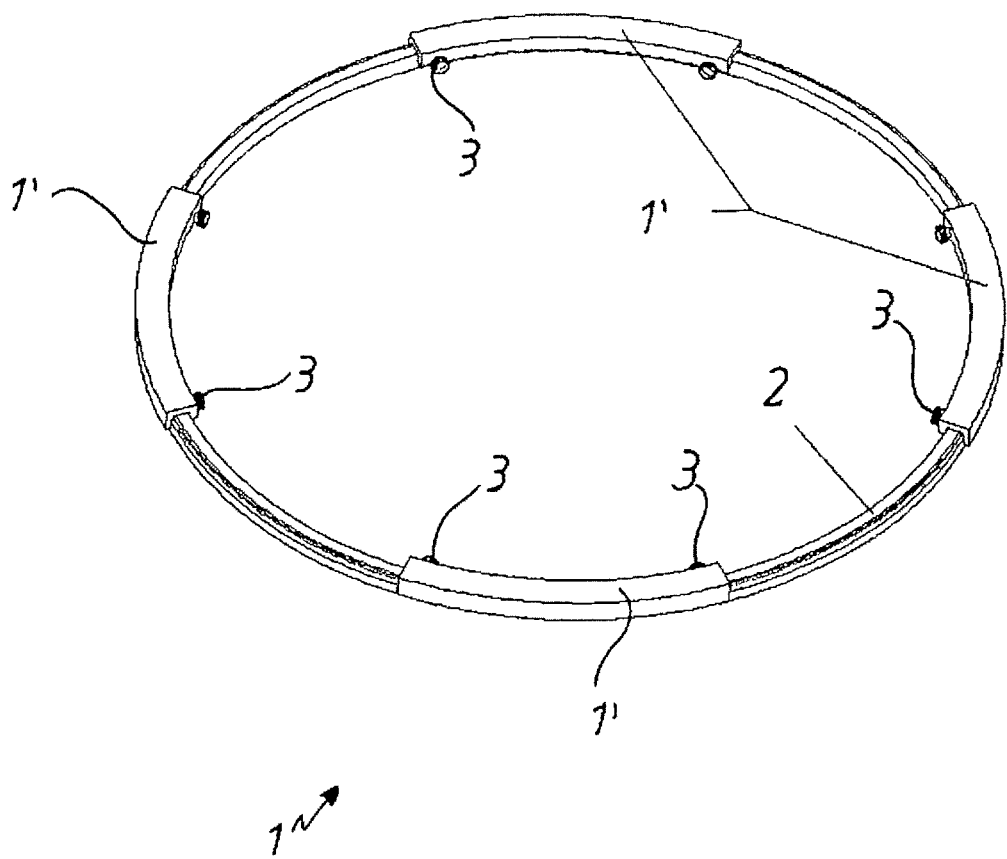
FIG. 1 A schematic diagram of the assembly tool according to the invention.
Figure 2:
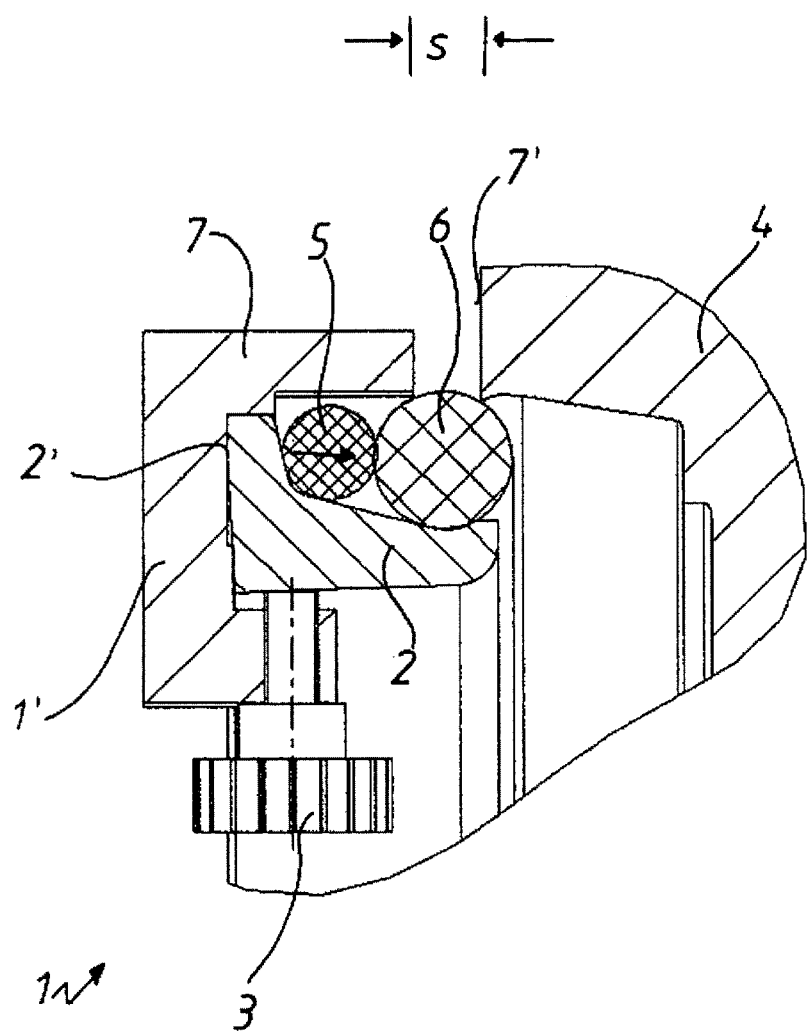
Figure 3:
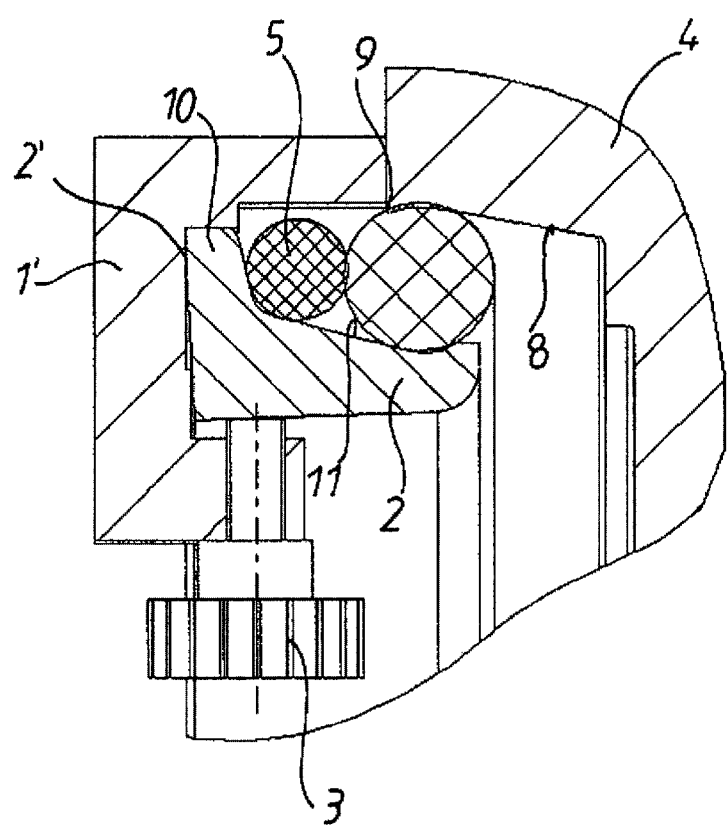

FIG. 1 shows an assembly tool 1, in this example consisting of four arcuate segments, for the assembly of a slide ring 2, which can be seen more clearly in FIGS. 2 and 3. The clamping elements 1' that form the assembly tool 1 are made out of plastic. Each clamping element 1' which has a specific circumferential length, has an approximately U-shaped cross-section and is pushed onto the side of the slide ring 2 that forms the sealing surface and secured relative to the slide ring 2 by means of clamp screws 3.

FIG. 2 shows a partial view of the assembly tool 1 according to FIG. 1 in a position before a sealing body is pressed in. An individual clamping element 1'. the slide ring 2, a housing part 4, an assembly O-ring 5 as well as an elastic sealing body 6 are visible, A clamp screw 3, by way of which the slide ring 2 is secured relative to the clamping element, is also visible. As already explained with regard to FIG. 1, each clamping element 1' has a cross section that is approximately U-shaped, and overlays the sealing surface 2' of the slide ring 2. By reducing the gap S between the leg 7 and the opposing side of the housing part 7' visible in FIG. 1, the elastic sealing body 6 is pressed into its position within the housing part 4.

FIG. 3 shows the state after the sealing body 8 has been pressed into the location bore 8 of the housing part 4. The approximately U-shaped cross section of the clamping element 1', the assembly O-ring 5 and the sealing surface 2' of the slide ring 2 are visible. The location bore 8 is provided with an undercut 9, behind which the elastic sealing body 6 must be inserted, so that it can no longer slide out of the location bore 8. In this example, the application of force is generated by operators, who press the respective clamping element 1' in the direction of the housing part 4. When the mounting position of the elastic sealing body 8 shown in FIG. 3 is within the location bore 8, the respective clamping element 1' is removed from the slide ring 2 by loosening the clamp screws 3 visible in FIG. 1 and the assembly O-ring 5 is drawn over the radial leg 10 of the slide ring 2 from the region of the sealing body seating 11 thereof via band-shaped buttstraps shown in FIG. 4.

Figure 4:
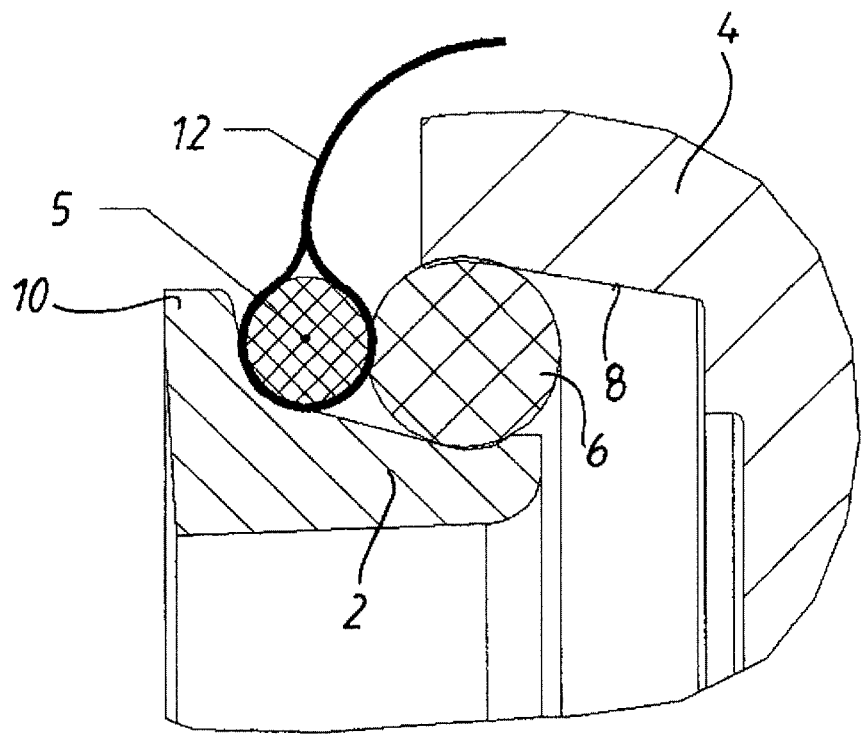
FIG. 4 A partial view through the fully assembled seal before the removal of the assembly O-ring.

FIG. 4 shows a partial view of the fully assembled seal, wherein the assembly-O-ring 5 is still located behind the sealing body 6. Also shown is the slide ring 2 as well as the housing part 4. The assembly O-ring 5 is surrounded by a band-shaped buttstrap 12. Viewed in the circumferential direction of the assembly O-ring 5, multiple such buttstraps 12 are positioned there. After the successful assembly of the sealing body 6 along with the slide ring 2 within the location bore 8 of the housing part 4, the assembly O-ring 5 is removed from the region of the slide ring 2 over the radial leg of 10 of the slide ring 2 by pulling on the buttstraps 12.

Figure 5:
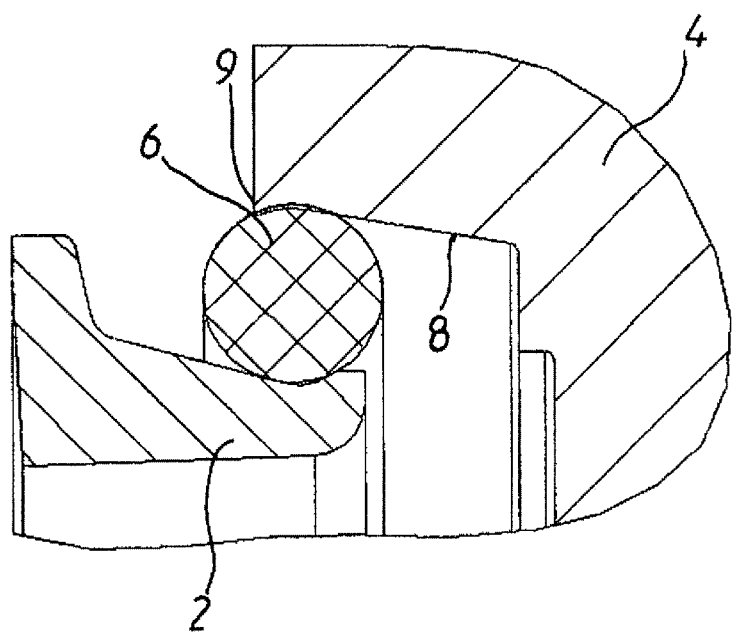
FIG. 5 A cross section of the fully assembled seal.

FIG. 5 shows a cross-section of the fully assembled slide ring 2, and the respective sealing body 6 thereof. It can be seen that the sealing body 8 is positioned within the location bore 8 of the housing part 4 in such a way that it can no longer slide over the undercut 9 on its own.

The invention claimed is:

1. An assembly tool for inserting a first ring and an elastic sealing body of a slide ring seal into an associated housing part, the assembly tool comprising:
   a plurality of clamping elements formed as discrete arcuate segments configured to engage an arcuate portion of said first ring at a first surface of said first ring; and
   an assembly O-ring configured to be located during an assembly operation between the elastic sealing body and a second surface of the first ring axially inward from the first surface, said O-ring and said elastic sealing body being in contact with an axially-extending surface of said first ring during said assembly operation;
   wherein and the clamping elements are advanceable in an axial direction toward the housing part in order to mount the sealing body within the housing part during said assembly operation; and
   wherein the assembly O-ring is configured to be removable from the slide ring seal after the first ring and elastic sealing body are successfully inserted within said associated housing part so as to allow re-use of the assembly O-ring for another assembly operation of another slide ring seal.

2. The assembly tool according to claim 1, wherein each of the clamping elements is formed to have an approximately U-shaped cross-section so as to be configured to be brought into operative connection with the first ring in a clamping manner.

3. The assembly tool according to claim 1, wherein the advancement in said axial direction of individual clamping elements of said plurality of clamping elements can be effected by use of another tool.

4. The assembly tool according to claim 1, wherein the advancement in said axial direction of individual clamping elements of said plurality of clamping elements can be effected manually by at least one operator.

5. The assembly tool according to claim 1, wherein the assembly O-ring can be removed from the first ring after successfully positioning the sealing body within the housing part.

6. The assembly tool according to claim 1, wherein the assembly O-ring is provided with an approximately band-shaped buttstrap.

7. The assembly tool according to claim 1, wherein the clamping elements are provided with stop faces which come to rest on an opposing surface of the housing part after successfully positioning the sealing body within the housing part.

8. The assembly tool according to claim 1, wherein the clamping elements are made of plastic.

9. The assembly tool according to claim 1, wherein the slide ring seal is a running gear seal.

10. An assembly tool for inserting a first ring and an elastic sealing body of a slide ring seal into an associated housing part, the first ring having an L-shaped cross section formed by a radially-extending portion and an axially-extending portion, the first ring having a sealing surface, a first inner surface extending radially, and a second inner surface extending axially, the axially-extending portion being axially inward of the sealing surface toward said associated housing part, the assembly tool comprising:
   a plurality of clamping elements formed as discrete arcuate segments configured to engage an arcuate portion of said first ring at said sealing surface of said first ring; and
   an assembly O-ring configured to be located during an assembly operation between the elastic sealing body and said first inner surface of the first ring, said O-ring and said elastic sealing body being in contact with said second inner surface at a radially external side of the axially extending portion of said first ring during said assembly operation for inserting the first ring and elastic sealing body into said associated housing part;
   wherein the clamping elements are advanceable in an axial direction toward the housing part in order to mount the sealing body within the housing part; and
   wherein the assembly O-ring is configured to be removed after the first ring and elastic sealing body are successfully positioned within said associated housing part.

* * * * *